United States Patent
Ibrahim (10) Patent No.: US 7,474,961 B2
(45) Date of Patent: Jan. 6, 2009

(54) SYSTEM TO DETERMINE THE PATH OF A VEHICLE

(75) Inventor: Faroog Abdel-kareem Ibrahim, Dearborn Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 911 days.

(21) Appl. No.: 11/051,414

(22) Filed: Feb. 4, 2005

(65) Prior Publication Data

US 2006/0178824 A1   Aug. 10, 2006

(51) Int. Cl.
*G01C 21/30* (2006.01)

(52) U.S. Cl. ...................................... 701/209; 701/208

(58) Field of Classification Search ......... 701/200–213; 340/995.1–995.28
See application file for complete search history.

(56) References Cited

U.S. PATENT DOCUMENTS

| | | | |
|---|---|---|---|
| 5,315,295 A | 5/1994 | Fujii | |
| 5,485,381 A | 1/1996 | Heintz et al. | |
| 5,748,476 A | 5/1998 | Sekine et al. | |
| 5,790,403 A | 8/1998 | Nakayama | |
| 6,005,492 A | 12/1999 | Tamura et al. | |
| 6,014,608 A | 1/2000 | Seo | |
| 6,092,005 A | 7/2000 | Okada | |
| 6,092,014 A | 7/2000 | Okada | |
| 6,125,324 A | 9/2000 | Matsuda et al. | |
| 6,138,084 A | 10/2000 | Mine | |
| 6,141,617 A | 10/2000 | Matsuda et al. | |
| 6,188,316 B1 | 2/2001 | Matsuno et al. | |
| 6,191,704 B1 | 2/2001 | Takenaga et al. | |
| 6,199,011 B1 | 3/2001 | Matsuda | |
| 6,268,825 B1 | 7/2001 | Okada | |
| 6,285,923 B1 | 9/2001 | Matsuda et al. | |
| 6,343,253 B1 | 1/2002 | Matsuura et al. | |
| 6,392,535 B1 | 5/2002 | Matsuno et al. | |
| 6,424,904 B1 | 7/2002 | Takahashi et al. | |
| 6,442,453 B1 | 8/2002 | Fukuoka | |
| 6,459,365 B2 | 10/2002 | Tamura | |
| 6,633,811 B1 | 10/2003 | Aumayer | |
| 7,219,012 B2 * | 5/2007 | Yoshikawa et al. | 701/209 |
| 7,400,969 B2 * | 7/2008 | Watanabe et al. | 701/200 |
| 2002/0161513 A1 | 10/2002 | Bechtolsheim et al. | |
| 2002/0193944 A1 | 12/2002 | Stewenius | |
| 2003/0065432 A1 | 4/2003 | Shuman et al. | |

\* cited by examiner

*Primary Examiner*—Richard M. Camby
(74) *Attorney, Agent, or Firm*—Brinks Hofer Gilson & Lione (57) ABSTRACT

The present invention provides a system and method of selecting a most likely path of a vehicle from a list of candidate paths. If only one candidate path exists, that path is identified as the most likely path. For multiple candidate paths, cost functions determine the weight of various parameters associated with each candidate. The parameters may include lane information, the vehicle speed, the vehicle travel direction, the lateral speed of the vehicle, the state of various signals, such as the turn signals. From the various weights determined by the cost functions, the candidate path with the highest confidence level is determined to be the most likely path.

24 Claims, 9 Drawing Sheets

SYSTEM TO DETERMINE THE PATH OF A VEHICLE

BACKGROUND

The present invention generally relates to a system to determine the path of a vehicle.

Increasingly, navigation systems have been installed in vehicles that provide guidance to the driver of the vehicle. Based on a map database and GPS, the navigation system informs the driver about the position of the vehicle on a particular route. Because the map database includes the road shape of the route, the system can inform the driver of upcoming curves along the roadway and provide warnings about the curves. However, the aforementioned systems do not provide any real threat assessment of the upcoming curves.

SUMMARY

In overcoming the above mentioned drawbacks and other limitations of the related art, the present invention provides a system and method of selecting a most likely path of a vehicle from a list of candidate paths. If only one candidate path exists, that path is identified as the most likely path. For multiple candidate paths, cost functions determine the weight of various parameters associated with each candidate. The parameters may include lane information, the vehicle speed, the vehicle travel direction, the lateral speed of the vehicle, the state of various signals, such as the turn signals. From the various weights determined by the cost functions, the candidate path with the highest confidence level is determined to be the most likely path. This information may be transmitted to a curve speed warning module of the system to alert the driver that the vehicle exceeds a safe speed for an upcoming curve in the road.

Further features and advantages of this invention will become apparent from the following description, and from the claims.

DETAILED DESCRIPTION

Figure 1:
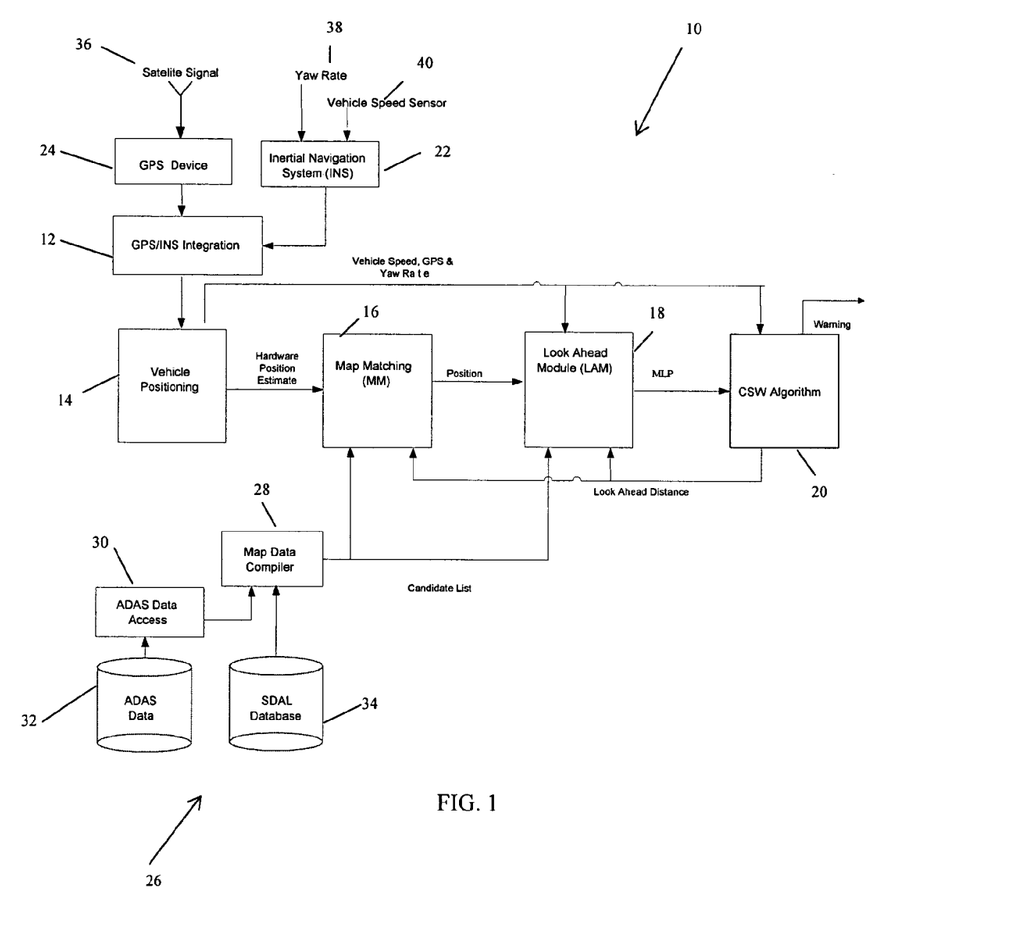
FIG. 1 is a block diagram of a system for warning a vehicle about its curve speed in accordance with the invention.

Referring now to the drawings, a system embodying the principles of the present invention is illustrated therein and designated at 10. As its primary components, the system 10 includes a global positioning system (GPS) and inertial navigation system (INS) integration module 12, a vehicle positioning module 14, a map matching module 16, a look ahead module 18, and a curve speed warning module 20. The system 10 is also provided with an inertial navigation system 22, a GPS receiver 24, a map database 26, and yaw rate and vehicle speed sensors. The map database 26 includes a map data compiler 28 and an ADAS data access 30 that receives information from an ADAS data base 32. The map data complier 28 also receives information from an SDAL database 34. The map database may be a database that is commercially available.

The GPS receiver 24 receives satellite information 36 related to the vehicle GPS position. In the GPS/INS integration module 12, the GPS position is augmented using, for example, a Kalman filter, with the yaw rate 38 and the vehicle speed 40 obtained through the inertial navigation system 22. The information from the GPS/INS integration module 12 is provided to the vehicle positioning module 14, where the vehicle position is calculated in a global coordinate system.

The map matching module 16, implemented with a map matching algorithm, receives the hardware position estimate from the vehicle positioning module 14 and information from the map database 26 to calculate the vehicle position on the map. The look ahead module 18 then receives the map position information from the map matching module 16, as well as information from the vehicle positioning module 14 and the map database 26, and looks ahead in the map from the calculated map position and calculates the candidate list of probable intended driving paths, in particular, a most likely path (MLP) based on probabilities.

Once the MLP is determined, a curvature calculation algorithm residing, for example, in the look ahead module 18, evaluates the most likely path to determine the curvature values, which, along with the vehicle speed from the vehicle positioning module 14, are passed to the curve speed warning module 20. A threat assessment algorithm implemented in the curve speed warning module 20 assesses the threat to the vehicle and makes a warning decision 44.

The threat assessment algorithm in the curve speed warning module 20 evaluates the curvature values from the look ahead module 18 to assess the potential threat of the calculated curvature of the road based on a cost function that takes into consideration, for example, the vehicle speed, the estimated projected speed profile, the travel distance to the curvature point, the curvature, the estimated road conditions, and the driver reaction time. The estimated road conditions may be calculated from the vehicle's signals, such as brake signals, turn signals, ambient temperature, and wiper functions. The curve speed warning system 20 then initiates a warning level based on the calculated threat level.

The look ahead module 18 determines the most probable path of the vehicle using, for example, information from vehicle positioning, lane information, lateral velocity, and vehicle signals, such as turn signals, and state. The most probable path and other possible alternate paths can be predicted using the vehicle's travel direction, the direction of the road, the vehicle lane, and the predicted directional change. This information is evaluated using a cost function to weight each parameter with respect to the consideration that the parameter will have toward predicting the vehicle's most probable path.

The long ahead module 18 also uses the look ahead distance to assemble a candidate path subset that is projected out to a selected distance from the vehicle's current position. If only one possible candidate path exists, it will be returned with 100% confidence. Otherwise, a list of all possible candidate paths (and their associated confidence levels) within the look ahead distance will be calculated to determine the candidate path with the highest confidence level, that is, the MLP.

Provided with candidate list of paths, cost functions assign a total weight for each candidate. The candidate with the higher weight is selected as the MLP. Depending upon the application, different cost functions are used for various scenarios. For each road scenario, there are associated aided signals, or parameters, such as the vehicle lateral velocity, lateral position, turn signal, boundary types, position of the accelerator pedal, and the deceleration of the vehicle. Moreover, each aided signal has a precedence level, such that for each scenario the cost functions are calculated in ascending precedence beginning with precedence 1. If a particular cost function determines a weight greater than about 0.5, then the system 10 does not employ the cost function of the next precedence.

Figure 2:
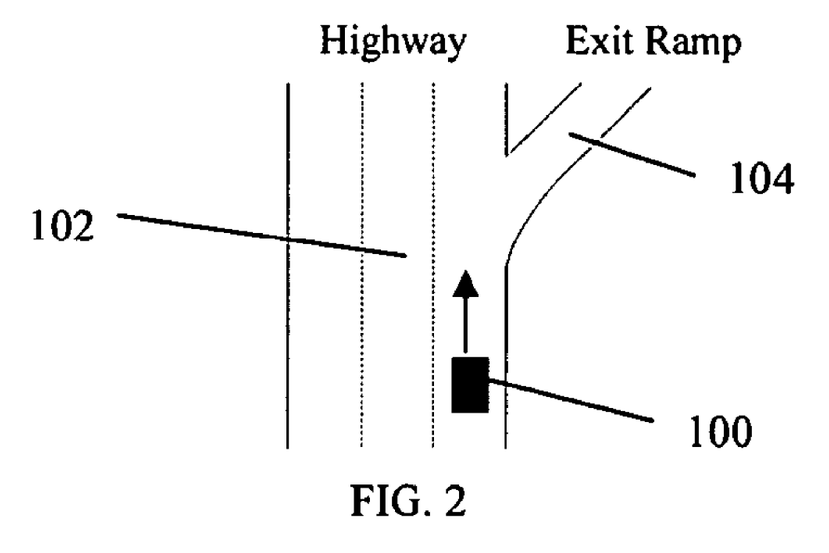
FIG. 2 illustrates a vehicle moving along a road with an exit ramp.

For example, a scenario is shown in FIG. 2 in which a vehicle 100 is moving along highway 102 with an exit ramp 104. Here, the lateral velocity $v_{Lat}$ and the lateral position $d_{Lat}$ have a precedence level 1. In this situation, the look ahead module 18 detects a lane change by the vehicle 100 toward the upcoming exit ramp 104. To achieve this, the lateral velocity is defined as $$v_{Lat} = \dot{d}_{Lat} = v * \Psi$$

where $\dot{d}_{Lat}$ is the rate of change of the lateral position, v is the vehicle speed, and $\Psi$ is the heading angle of the vehicle with respect to the road.

Figure 3:
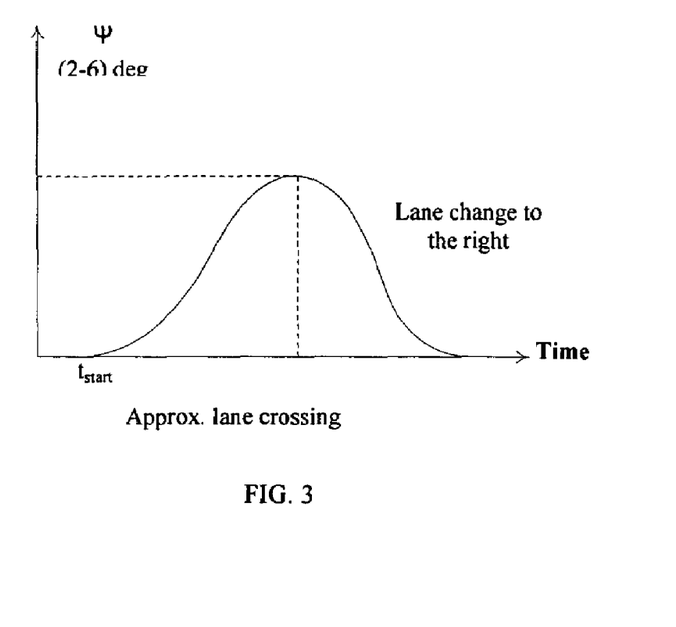
FIG. 3 illustrates the change in the heading angle of the vehicle of FIG. 2 over time.
Figure 4:
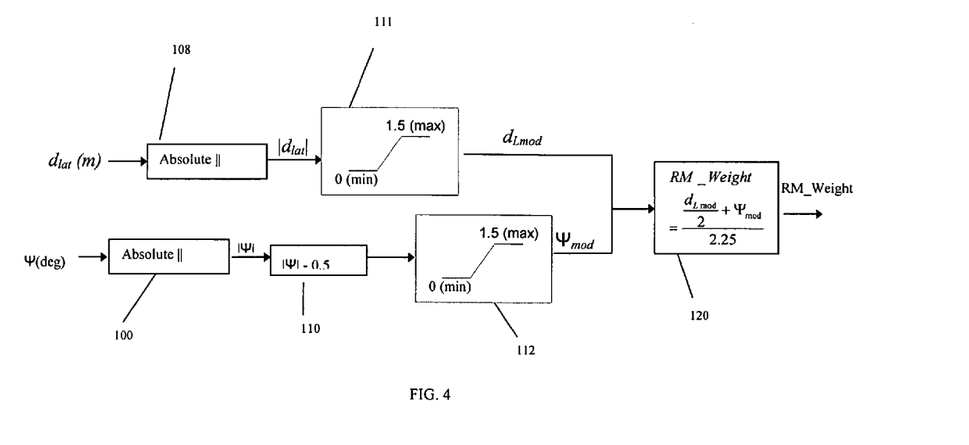
FIG. 4 is a block diagram of a cost function for the scenario of FIG. 2 in accordance with the invention.

The behavior of the heading angle $\Psi$ during a lane change is shown in FIG. 3. The lane keeping behavior produces a heading angle $\Psi$ in the range of, for example, ±0.5 degrees. Therefore, this angle can be used as a factor in the ramp cost function weight (RM_Weight) when its absolute value exceeds, for example, 0.5 degrees. However, this factor may not be able to detect a very slow lane change. To overcome this, the cost function fuses the lateral velocity measurement with the lateral distance position as shown in FIG. 4, where $$\Psi(deg) = \frac{v_{Lat}(m/s)}{v(m/s)} * \frac{180}{\pi},$$

if the lateral distance is measured in meters (m) and the heading angle is determined in degrees. Specifically, the absolute values of $\Psi$ and $d_{Lat}$ are determined in modules 106 and 108, respectively. Then in module 110, a predefined value, such as 0.5 degrees, is subtracted from the absolute value of the heading angle. Modified values of the lateral position $d_{Lmod}$ and the heading angle $\Psi_{mod}$ are determined in respective limiter modules 111 and 112, so that regardless of the input values to the modules 110 and 112, the outputs from these modules will be within the defined minimum (min) and maximum (max) values. The RM_Weight is then calculated according to a predefined expression as shown in a module 114.

Figure 5:
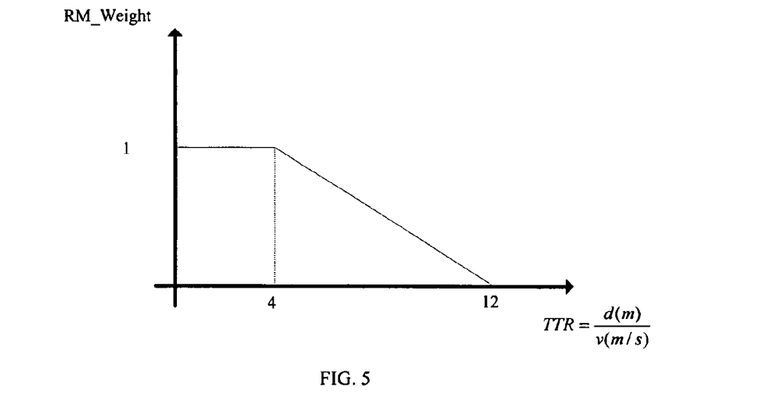
FIG. 5 depicts a cost function for the lane boundaries of the scenario of FIG. 2 in accordance with the invention.

Information about the boundary type is assigned a precedence level 3. If the boundary type of interest is solid, or if both boundary types are solid, the RM_Weight is determined as a function of the time to reach (TTR) the ramp 104 (FIG. 2) as shown in FIG. 5. That is, for a TTR less than 4, the RM_Weight is 1, for TTR equal to or greater than 4, the RM_Weight decreases linearly from 1 to zero when the TTR equals 12.

Figure 6:
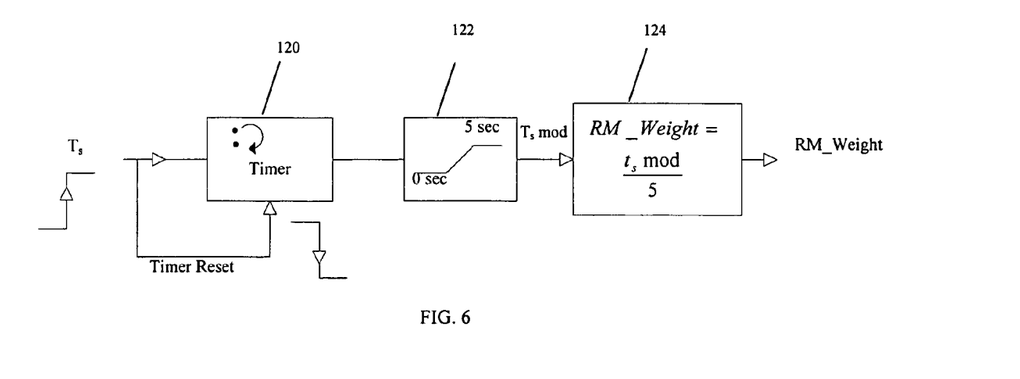
FIG. 6 is a block diagram of a cost function for the turn signal for the scenario of FIG. 2 in accordance with the invention.

The time the turn signal is on is assigned a precedence level 2. In particular, as shown in FIG. 6, a resetable timer module 120 determines the length of time the turn signal is on. This information is forwarded to a limiter block 122 which provides a modified $T_{smod}$ to the calculation module 124 which in turn calculates the Rm_Weight using the expression associated with that module. Thus, in sum, the weight of the turn signal is a function of the time the turn signal is on. If this time is, for example, 5 seconds, the weight of the signal reaches its maximum value of 1.

Figure 7:
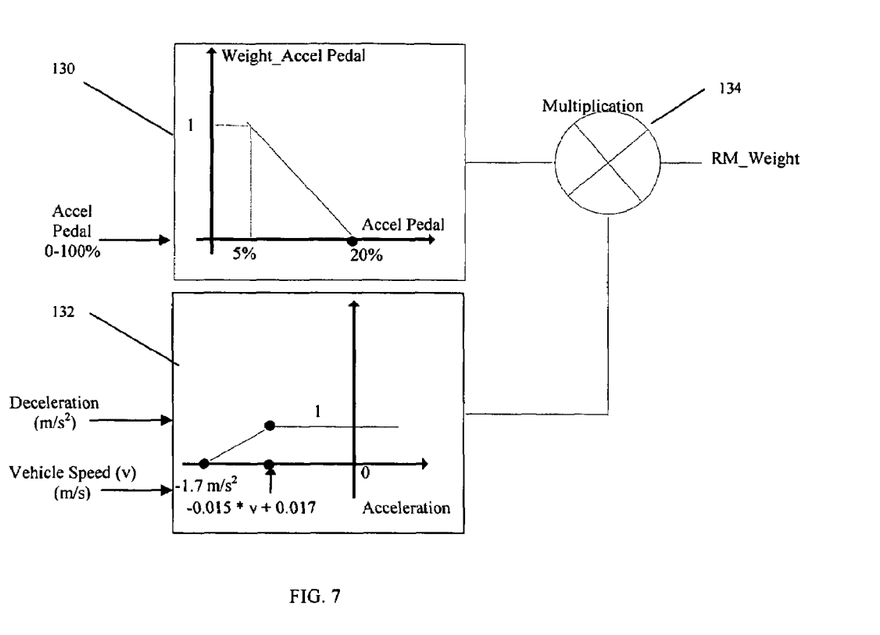
FIG. 7 is a block diagram of a cost function associated with the acceleration/deceleration of the vehicle in the scenario depicted in FIG. 2 in accordance with the invention.

Turning now to FIG. 7, the deceleration or acceleration of the vehicle is assigned a precedence level 4. When the driver's foot is on the accelerator pedal, the driver is either trying to maintain the current vehicle speed or accelerate the vehicle. To decelerate, the driver's foot is taken off the accelerator pedal. The gas pedal status is expressed in the accelerator pedal percentage module 130. In order to distinguish between the deceleration as a result of a vehicle decelerating in front of the host vehicle and the deceleration associated with an upcoming ramp, the weight of the accelerator pedal is proportional to the magnitude of the vehicle deceleration. The deceleration signal is estimated by the algorithm implemented in the CSW module 20 and is forwarded to the look ahead module 18. Thus, in the present implementation, the module 130 generates a cost function weight RM_Weight of 1 when the accelerator pedal percentage is less than about 5%. If it is above 20%, the weight is zero. However, this weight is modified by a module 132 associated with the vehicle acceleration, that is, the values of the modules 130 and 132 are multiplied together in a module 134. In this implementation, if the vehicle acceleration is less than about 1.7 m/sec², the weight from the module 130 is multiplied by zero, such that the final RM_Weight is zero. If, however, the acceleration is more than the value of the defined function (−0.015*v+0.17), where v is the vehicle speed in m/s, the weight from the module 130 is multiplied by one, such that the final weight RM_Weight is 1. Note that this RM_Weight has a value if the deceleration occurs while the vehicle is on a lane that has a solid boundary type or a missing boundary (or both boundary types are solid). Therefore, this ramp weight is multiplied by the weight function shown in FIG. 5.

Figure 8:
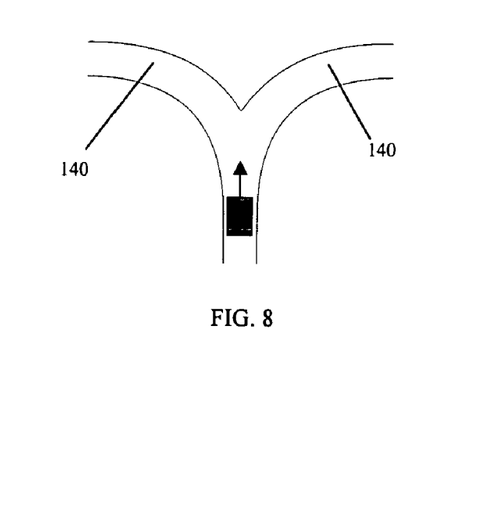
FIG. 8 illustrates another scenario in which a vehicle approaches similar curved branches in a roadway.

Scenarios involving forked roads, such as those identified at 140 in FIG. 8, are quite similar to those involving exit ramps (FIG. 2), such that the same cost functions in ascending precedence can be used. Note that when the upcoming curved road segments are similar, that is, the segments have about the same curvature and about the same posted advisory speeds, the deceleration-aided signal (FIG. 7) is not employed.

Figure 9:
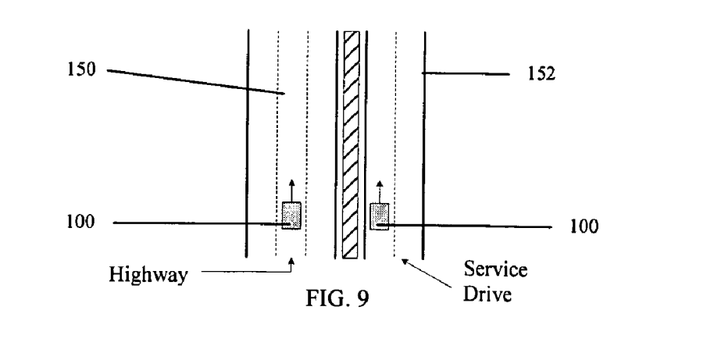
FIG. 9 illustrates yet another scenario in which a vehicle may be moving along a highway or a service drive.
Figure 10:
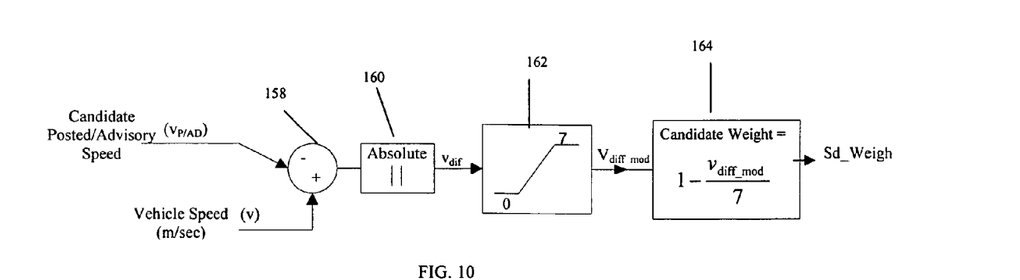
FIG. 10 is a block diagram of a cost function to determine whether the vehicle in the scenario of FIG. 9 is on the highway or the service drive when posted/advisory speeds are available from a map database.

Another scenario, as shown in FIG. 9, involves deciding whether the vehicle 100 is on a highway 150 or on a service drive 152 using aided signals such as the posted/advisory speed, the vehicle speed, and road boundary types. This aids in locating the vehicle on the appropriate road, and therefore to extract the correct candidate set. If a posted/advisor speed $V_{p/AD}$ exits for the candidate road exists in the map database 26, the cost function shown in FIG. 10 is employed and assigned a precedence level 2. This cost function can be employed in any situation to help locate the vehicle on the correct road.

Specifically, the absolute value of the difference (as determined in 158) of the vehicle speed v and the $V_{p/AD}$ is determined in a module 160. This difference $v_{diff}$ is forward to a limiter 162 to calculate a modified difference $v_{dif\,mod}$ which in turn is transmitted to a calculation block 164 to determine the service drive cost function weight (SD_Weight) employed. Thus, if the absolute difference between the vehicle speed and the posted advisory speed is greater than 7 m/sec, the weight of the road candidate is zero.

Figure 11:
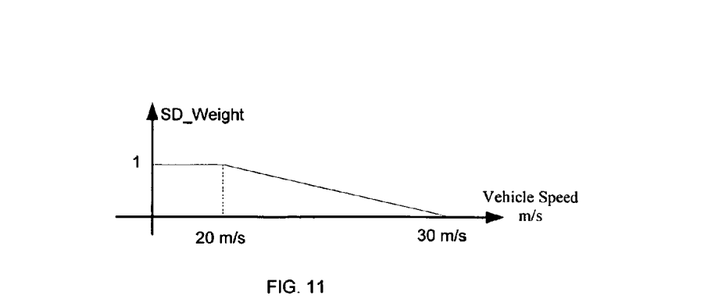
FIG. 11 depicts a cost function to determine whether the vehicle in the scenario of FIG. 9 is on the highway or the service drive when posted/advisory speeds are not available.

If a posted/advisory speed is not available, the cost function shown in FIG. 11 is employed, where it is assumed that the average vehicle speed on a highway is greater than on a service drive. In this case, if the vehicle speed is less than 20 m/s, the weight is one. As the speed increases from about 20 m/s to a bout 30 m/s, the weight decreases from one to zero.

Figure 12:
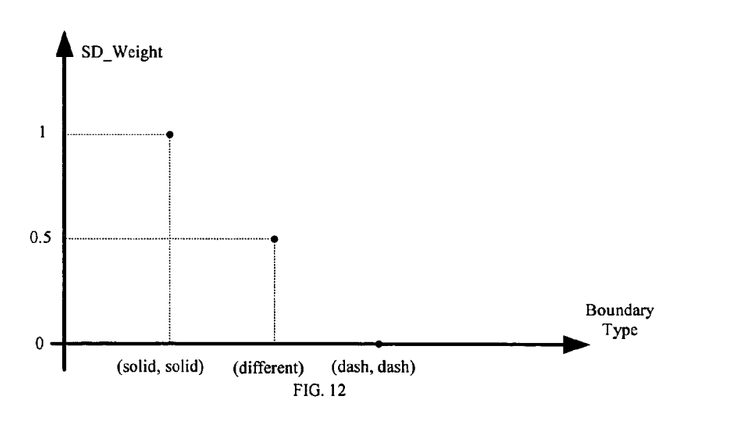
FIG. 12 depicts a cost function to determine whether the vehicle in the scenario of FIG. 9 is on the highway or the service drive based on lane boundary type information.

If the left and right boundaries are solid, it is probable that the vehicle path is a service drive. If the boundaries are dashed, it is probable that the vehicle path is a highway. Therefore, the cost function shown in FIG. 12 is employed, such that, if the vehicle is on a service drive, the weight is one, and if the vehicle is on a highway, the weight is zero. If one boundary is dashed and the other is solid, the weight function is 0.5.

Moreover, an estimate of the instantaneous curvature can be used to modify the confidence in the current selected road and help in predicting the future vehicle position for a limited distance ahead. This estimate is performed in the algorithm implemented in the CSW module 20 and passed to the look ahead module 18. This curvature estimate is compared with the instantaneous curvature coming from the map database. The difference between the two curvature values contributes to the confidence in the current selected road. The weight of the cost function varies inversely with this difference.

In a preferred implementation, the system 10 initially determines if the vehicles is on a highway or a serviceway by determining the weight according to the cost function shown in FIG. 12. If the weight is less than about 0.5, the system 10 employs either the cost function shown in FIG. 10 if the advisory speed is posted or in FIG. 11 if the advisory speed is not posted. If either of these functions determines a weight greater than about 0.5, than the vehicle is likely on a service road. Otherwise, the vehicle is driving along a highway.

After the system 10 determines the type of road on which the vehicle is moving, the system employs the cost functions in ascending precedence shown in FIG. 4, FIG. 6, FIG. 5, and FIG. 7. As each cost function is employed, if that cost function determines a weight greater than about 0.5, then the system 10 assumes that the vehicle is likely approaching an exit ramp to determine the most likely path, and thus there is no need to proceed to the next cost function. If the weight is less than about 0.5, then the system 10 proceeds to use the next cost function. Note again, that if the system 10 uses the cost function shown in FIG. 7, the weight calculated from that cost function is multiplied by the weight calculated from the cost function of FIG. 5. If the cost functions of FIG. 4, FIG. 6, FIG. 5, and FIG. 7 all determine that the respective weight is less than about 0.5, than the system 10 assumes the vehicle is not approaching an exit ramp.

As a person skilled in the art will readily appreciate, the above description is meant as an illustration of an implementation of the principles this invention. This description is not intended to limit the scope or application of this invention in that the invention is susceptible to modification, variation and change, without departing from spirit of this invention, as defined in the following claims.

What is claimed is:

1. A system for determining the most likely driving path of a vehicle moving along a roadway, comprising:
    a map database;
    a map matching module which determines the vehicle's position on a map associated with the map database; and
    a look ahead module which evaluates the map for a curve ahead of the vehicle, the look ahead module determining a list of candidates of probable driving paths through the curve, each candidate being associated with one or more parameters having a weight determined by a respective cost function, the look ahead module analyzing the weights to determine the most likely path of the vehicle through the curve.

2. The system of claim 1 wherein the candidate path with the highest total weight is selected as the most likely path.

3. The system of claim 1 wherein the look ahead module is implemented with different cost functions associated with various roadway scenarios the vehicle potentially encounters.

4. The system of claim 1 wherein the one or more parameters includes the heading angle of the vehicle.

5. The system of claim 4 wherein the one or more parameters includes the lateral position of the vehicle.

6. The system of claim 1 wherein the one or more parameters includes the length of time for the vehicle to reach a curve in the roadway.

7. The system of claim 6 wherein the curve is an exit ramp.

8. The system of claim 1 wherein the one or more parameters includes the length of time a turn signal is activated.

9. The system of claim 1 wherein the one or more parameters includes the acceleration and deceleration of the vehicle.

10. The system of claim 1 wherein the one or more parameters includes the vehicle speed and the posted speed for the roadway to determine if the vehicle is on a service drive.

11. The system of claim 1 wherein the one or more parameters includes the boundary type of a lane in the roadway.

12. The system of claim 11 wherein the boundary type is solid.

13. The system of claim 11 wherein the boundary type is dashed.

14. A method for determining the most likely driving path of a vehicle moving along a roadway, comprising:
    determining the vehicle's position on a map associated with a map database;
    evaluating the map for a curve ahead of the vehicle;
    determining a list of candidates of probable driving paths through the curve, each candidate being associated with one or more parameters having a weight determined by a respective cost function; and
    analyzing the weights to determine the most likely path of the vehicle through the curve.

15. The method of claim 14 wherein the candidate path with the highest total weight is selected as the most likely path.

16. The method of claim 14 wherein the one or more parameters includes the heading angle of the vehicle.

17. The method of claim 16 wherein the one or more parameters includes the lateral position of the vehicle.

18. The method of claim 14 wherein the one or more parameters includes the length of time for the vehicle to reach a curve in the roadway.

19. The method of claim 14 wherein the one or more parameters includes the length of time a turn signal is activated.

20. The method of claim 14 wherein the one or more parameters includes the acceleration and deceleration of the vehicle.

21. The method of claim 14 wherein the one or more parameters includes the vehicle speed and the posted speed for the roadway to determine if the vehicle is on a service drive.

22. The method of claim 14 wherein the one or more parameters includes the boundary type of a lane in the roadway.

23. The method of claim 22 wherein the boundary type is solid.

24. The method of claim 22 wherein the boundary type is dashed.

* * * * *